US012756281B2

(12) United States Patent
Garrard

(10) Patent No.: US 12,756,281 B2
(45) Date of Patent: Oct. 6, 2026

(54) BARRIER COATING FOR AN ELECTRIC MOTOR ROTOR ASSEMBLY

(71) Applicant: BorgWarner Inc., Auburn Hills, MI (US)

(72) Inventor: Tyler R. Garrard, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 182 days.

(21) Appl. No.: 18/110,442

(22) Filed: Feb. 16, 2023

(65) Prior Publication Data

US 2023/0268814 A1 Aug. 24, 2023

Related U.S. Application Data

(60) Provisional application No. 63/312,484, filed on Feb. 22, 2022.

(51) Int. Cl.

*H02K 15/03* (2025.01)
*H02K 1/04* (2006.01)
*H02K 7/00* (2006.01)
*H02K 7/18* (2006.01)

(52) U.S. Cl.

CPC ............... *H02K 15/03* (2013.01); *H02K 1/04* (2013.01); *H02K 7/003* (2013.01); *H02K 7/1823* (2013.01)

(58) Field of Classification Search

CPC .......... H02K 15/03; H02K 1/04; H02K 7/003; H02K 7/1823

See application file for complete search history.

(56) References Cited

U.S. PATENT DOCUMENTS 6,655,004 B2 * 12/2003 Stuart .................. H02K 1/2781 29/598
11,979,064 B2 * 5/2024 Sugiura ..................... H02K 1/30
2005/0134137 A1 * 6/2005 Sweo ................... H02K 15/023 29/598
2006/0127253 A1 * 6/2006 Ekberg .................... H01F 41/02 417/420
2010/0019626 A1 * 1/2010 Stout ........................ H02K 3/50 310/214
2019/0345956 A1 * 11/2019 Iizuka ................. F04D 25/0606

FOREIGN PATENT DOCUMENTS

WO WO-2020209051 A1 * 10/2020 ............. H02K 15/12

* cited by examiner

*Primary Examiner* — Terrance L Kenerly
(74) *Attorney, Agent, or Firm* — Reising Ethington P.C.

(57) ABSTRACT

A rotor assembly configured to be used by an electric motor includes an output shaft; one or more permanent magnets coupled with the output shaft to prevent angular displacement of the permanent magnet(s) relative to the output shaft; one or more composite sleeves positioned concentrically and radially outwardly relative to the permanent magnets; and a barrier coating applied to the composite sleeve that prevents contact with a surface of the sleeve(s) exposed to an ambient environment.

13 Claims, 3 Drawing Sheets

BARRIER COATING FOR AN ELECTRIC MOTOR ROTOR ASSEMBLY

TECHNICAL FIELD

The present application relates to electric motors and, more particularly, to rotor assemblies used in electric motors.

BACKGROUND

Electric motors receive electric power in the form of voltage and current to induce angular movement of a rotor relative to a stator. Electric motors can be implemented in many different ways. In one implementation, the rotor can include permanent magnets concentrically positioned relative to an output shaft. The stator can include stator windings capable of receiving electrical current that induces the angular movement of the rotor relative to the stator. However, sometimes the rotor and stator are exposed to environments that can degrade the rotor assembly. It is possible to implement a more robust rotor assembly that can resist degradation in challenging environments.

SUMMARY

In one implementation, a rotor assembly is configured to be used by an electric motor and includes an output shaft; one or more permanent magnets coupled with the output shaft to prevent angular displacement of the permanent magnet(s) relative to the output shaft; one or more composite sleeves positioned concentrically and radially outwardly relative to the permanent magnets; and a barrier coating applied to the composite sleeve that prevents contact with a surface of the sleeve(s) exposed to an ambient environment.

In another implementation, a rotor assembly is configured to be used by an electric motor and includes an output shaft; one or more permanent magnets coupled with the output shaft to prevent angular displacement of the permanent magnet(s) relative to the output shaft; a composite sleeve positioned concentrically and radially outwardly relative to the permanent magnets; and a barrier coating applied to the composite sleeve over a radial surface and an axial surface of the composite sleeve.

In yet another implementation, a method of rotor assembly configured to be used by an electric motor, includes the steps of coupling one or more permanent magnets to an output shaft of the electric motor; applying a barrier coating to one or more composite rings; and assembling the composite rings and barrier coating over the permanent magnets such that the composite rings are positioned concentrically with respect to the permanent magnets.

DETAILED DESCRIPTION

Figure 1:
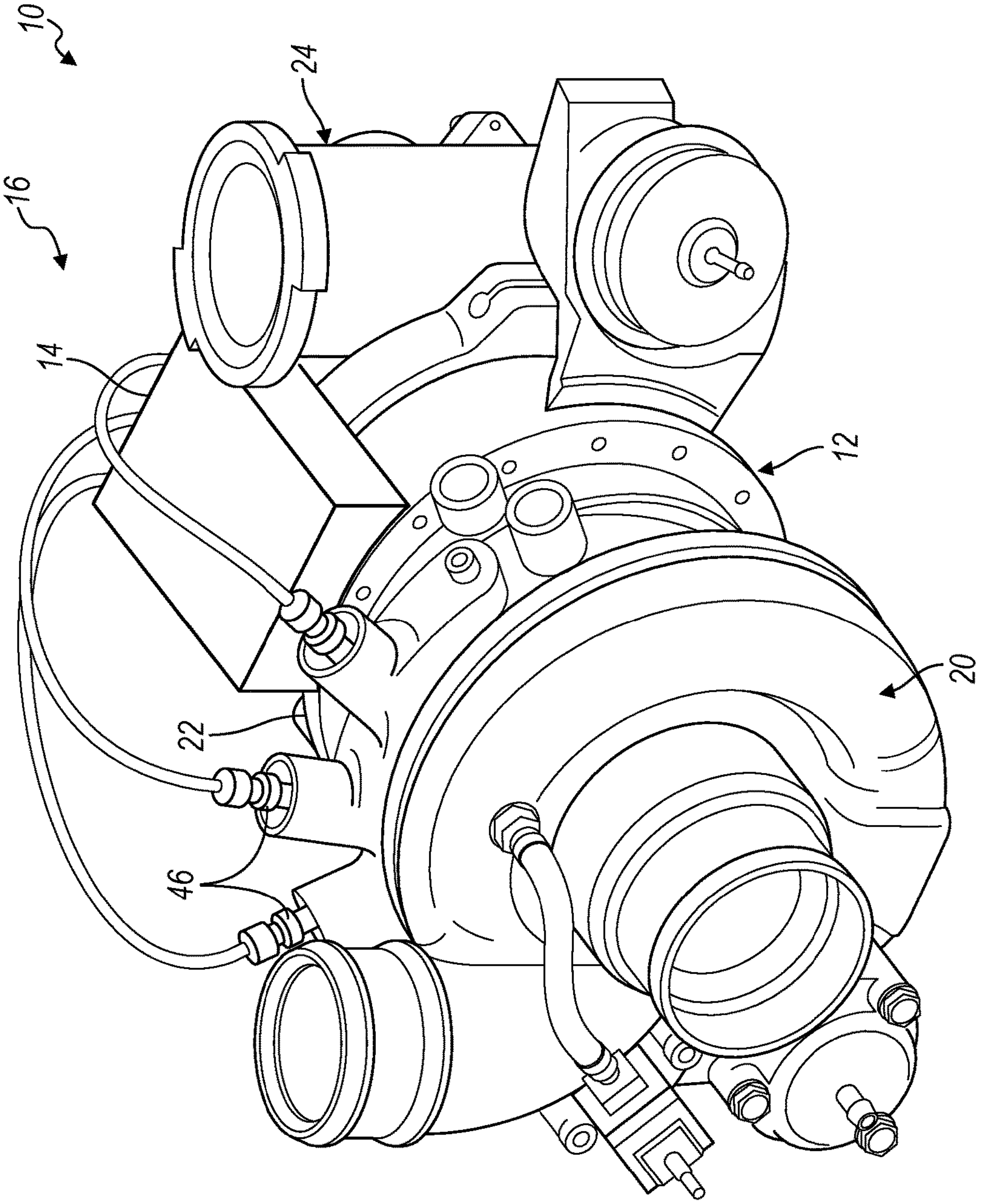
FIG. 1 is a perspective view depicting an implementation of an electrically-assisted turbocharger assembly.

An electric motor includes a rotor assembly having one or more permanent magnets and a stator that includes stator windings capable of receiving electrical current that angularly displaces the rotor relative to the stator. The permanent magnets can be concentrically coupled to an output shaft and bound on a radial outer surface by one or more composite sleeves. The composite sleeve(s) can structurally strengthen the rotor assembly permitting the rotor assembly and output shaft to rotate at elevated angular speeds relative to rotor assemblies without sleeves or having sleeves constructed from different materials, such as metal or metal alloy. Also, the composite sleeves can provide better electromagnetic field (EMF) performance relative to other sleeve materials, such as metal or metal alloys, thereby reducing Eddy current losses. However, in some applications, the rotor assembly can be exposed to an environment, such as a fluid or gasses, that degrades the composite sleeve. That is, the chemical content of the environment can degrade the material of the composite sleeve and cause failure. While sleeves constructed from other materials may resist challenging environments, the composite sleeves can permit the rotor assembly to rotate at elevated angular speeds relative to other materials. It would be helpful to implement a rotor assembly with one or more permanent magnets and a composite sleeve having a barrier coating that insulates the composite sleeve from the degrading fluid or environment and provide the composite sleeve an operational life that equals or exceeds that of sleeves made from other materials.

One or more permanent magnets can be coupled to the output shaft of the electric motor to prevent the angular displacement of the magnets relative to the shaft. A composite sleeve—also referred to as a composite fiber reinforced polymer (CFRP) sleeve—can fit over a radial outer surface of the permanent magnet(s) and provide compressive pressure and structural support for the rotor assembly. A barrier coating can be applied to the composite sleeve to isolate the sleeve from the environment in which the rotor assembly is exposed. For example, the barrier coating can prevent fluid from contacting the composite sleeve.

The barrier coating can exist and/or be applied in a variety of ways. For instance, the barrier coating could be sprayed onto the composite sleeve either before the sleeve is placed on the permanent magnet(s) or after the sleeve is combined with the magnet(s). The barrier coating may be applied to a radial outer surface of the composite sleeve or, alternatively, to both the radial outer surface and a radial inner surface of the sleeve. In some implementations, the barrier coating could comprise a powder coating, a brushed-on coating, an injection-molded layer, an electro-sprayed layer, or a layer created by immersing the composite sleeve or the rotor assembly in a bath of coating to coat the sleeve, to name a few possibilities. The implementations of an electric motor having a rotor assembly with permanent magnet(s), a composite sleeve, and a barrier coating are described with respect to an electrically-assisted turbocharger assembly used with an internal combustion engine. However, it should be understood that the composite sleeve and barrier coating can be implemented in other applications that use electric motors. For example, in another possible implementation, a traction motor used for propulsion of battery electric vehicles can use a rotor assembly having permanent magnet(s), a composite sleeve engaging the magnet(s), and a barrier coating that isolates the composite sleeve from an environment, such as a fluid.

Figure 2:
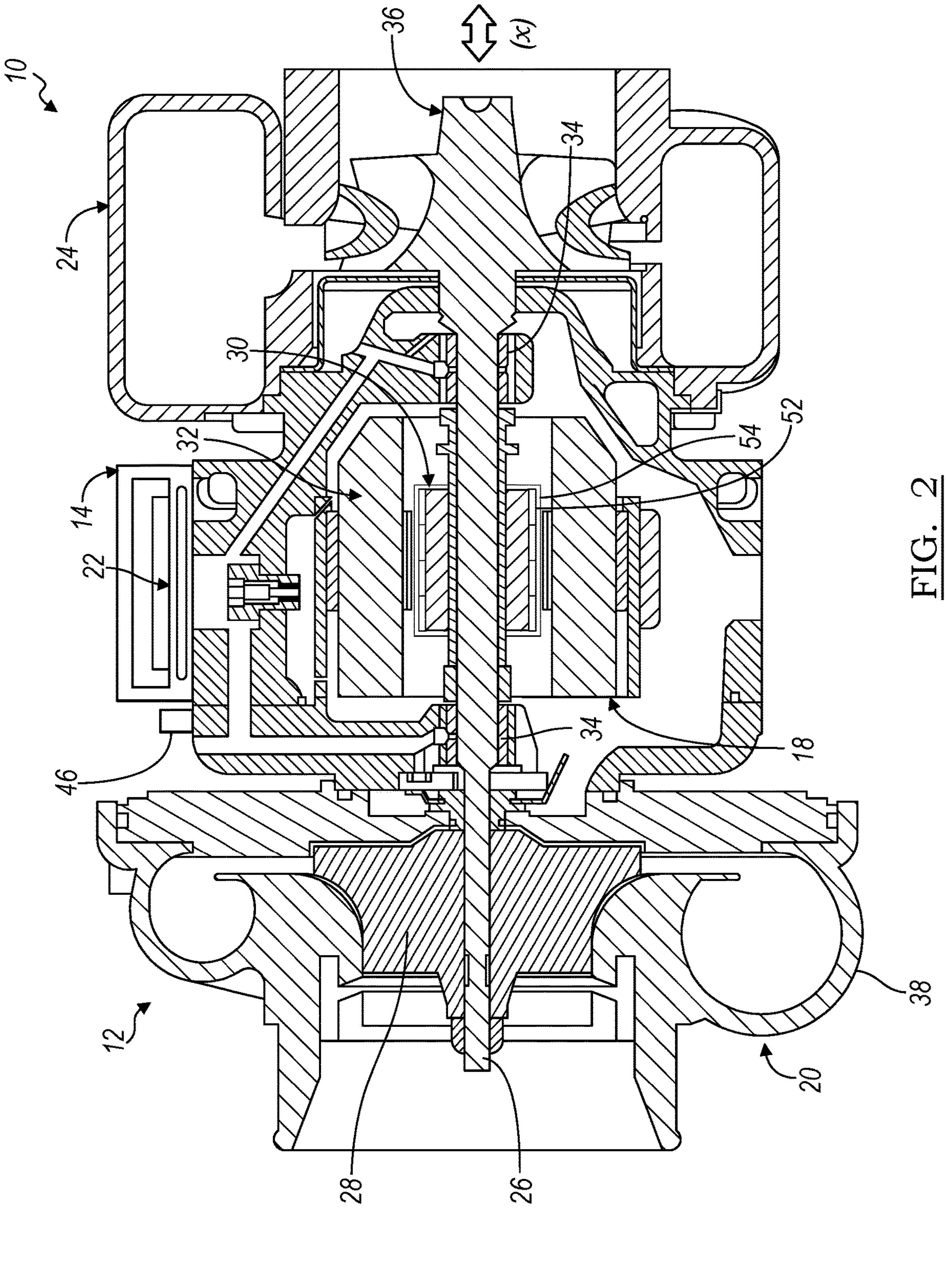
FIG. 2 is a cross-sectional view depicting an implementation of an electrically-assisted turbocharger assembly.

FIGS. 1-2 depict one implementation of an electrically-assisted turbocharger assembly 10 that includes an electrically-assisted turbocharger 12, an electronics assembly 14 received by a housing 16, and an electric motor 18. The electrically-assisted turbocharger 12 includes a compressor portion 20, an electric motor portion 22, and an exhaust portion 24 that are assembled to form a structure that receives the components of the turbocharger 12. A turbine shaft 26 extends through the compressor portion 20, the electric motor 18, and the exhaust portion 24 as can be appreciated in FIG. 2. At one end, a turbine shaft 26 couples with a compressor turbine 28, located in the compressor portion 20, that spins to compress air, which is ultimately supplied to an intake plenum (not shown) of an internal combustion engine (ICE). In this implementation, the turbine shaft 26 and the output shaft of the electric motor 18 are the same. Another portion of the turbine shaft 26 that is axially-spaced from the compressor turbine 28 and located in the electric motor 18 couples with a rotor assembly 30 of the electric motor 18.

The rotor assembly 30 can be positioned concentrically relative to a stator 32 included in the electric motor 18. One or more bearings 34 are included in the electric motor 18 and axially spaced along the turbine shaft 26 to support and stabilize the turbine shaft 26, the compressor turbine 28, the rotor assembly 30, and an exhaust turbine 36 as these elements rotate within the turbocharger 12 during operation. The exhaust turbine 36 is coupled to an end of the turbine shaft 26 distal to the compressor turbine 26 located in the exhaust portion 22.

The compressor portion 20 includes a compressor turbine chamber 38 in which the compressor turbine 28 spins in response to the rotation of the turbine shaft 26 and compresses air that is ultimately supplied to the intake manifold of the ICE. The compressor turbine 28 is coupled with the turbine shaft 26 that extends from the compressor portion 20 into the electric motor portion 22 and the exhaust portion 24. The rotor assembly 30 is coupled to the turbine shaft 26 so that the rotor assembly 30 and the turbine shaft 26 are not angularly displaced relative to each other. The rotor assembly 30 extends axially along the shaft 26 so that it is in close proximity to the stator 32. The stator 32 can include a plurality of windings that convey electrical current from power electronics and induce the angular displacement of the rotor assembly 30 and the turbine shaft 26 coupled to the rotor assembly 30 relative to the stator 32. In one implementation, the stator 32 and the rotor assembly 30 can be implemented as a direct current (DC) brushless motor that receives DC voltage from a vehicle battery. The amount of DC voltage applied to the stator 32 may be greater than 40 volts (V), such as can be provided by a modern 48V vehicle electrical system. Other implementations are possible in which a vehicle electrical system uses higher voltages, such as 400V and 800V. Electrical connectors 46 can be included on the electrically assisted turbocharger 12 and communicate electrical power from an electrical source to a PCB that regulates electrical current supplied to the electrical motor of the electrically-assisted turbocharger 12. A PCB housing can be coupled with the assembly 10 and include a cavity for receiving a PCB.

The exhaust portion 24 is in fluid communication with exhaust gases generated by the ICE. As the revolutions per minute (RPMs) of the crankshaft of the ICE increase, the volume of the exhaust gas generated by the ICE increases and correspondingly increases the pressure of exhaust gas in the exhaust portion 24. This increase in pressure can also increase the angular velocity of the exhaust turbine 36 that communicates rotational motion to the compressor turbine 28 through the turbine shaft 26. In this implementation, the compressor turbine 28 receives rotational force from the exhaust turbine 36 and the electric motor 18. More particularly, when the ICE is operating at a lower RPM, the electric motor 18 can provide rotational force to the compressor turbine 28 even though exhaust gas pressure within the exhaust portion 24 is relatively low. As the ICE increases the RPM of the crankshaft, exhaust gas pressure within the exhaust portion 24 can build and provide the rotational force that drives the compressor turbine 28.

However, it should be appreciated that the concepts described herein can be applied to electrically assisted turbochargers that are configured in different ways. For example, the electrically assisted turbocharger can be implemented using a compressor portion and an electric motor portion while omitting the exhaust portion. In such an implementation, the turbocharger includes a compressor turbine coupled to the electric motor via a turbine shaft without relying on an exhaust turbine to also be coupled to the turbine shaft. This implementation can sometimes be referred to as an electric supercharger because forced induction in this implementation relies solely on the rotational force provided by an electric motor rather than also using an exhaust turbine that is rotationally driven by exhaust gases. The compressor turbine chamber 38 is in fluid communication with a compressor inlet that draws air from the surrounding atmosphere and supplies it to the compressor turbine 28. As the PCB selectively provides current to the windings of the stator 32, the rotor assembly 30 is induced to rotate and impart that rotation on the turbine shaft 26 and the compressor turbine 28.

Figure 4:
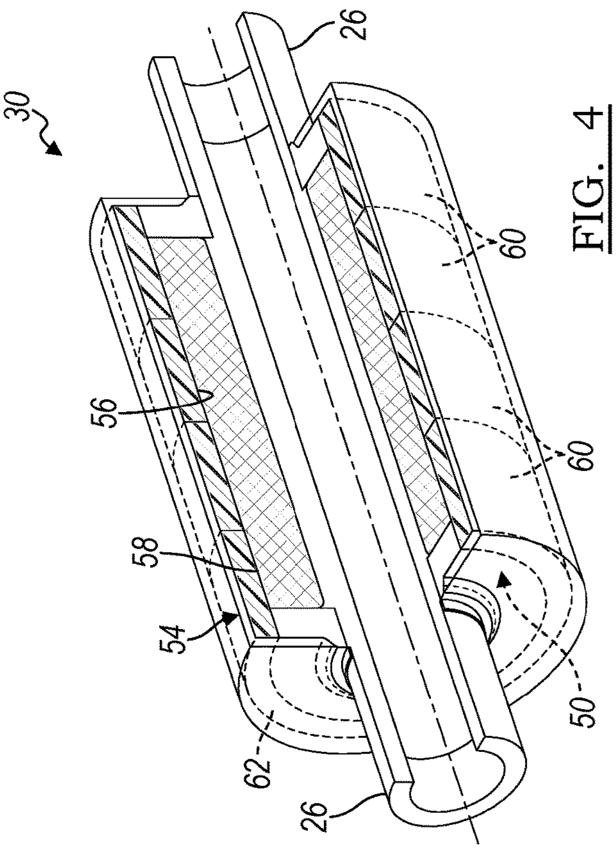
FIG. 4 is a perspective partial cross-sectional view depicting an implementation of a rotor assembly.
Figure 3:
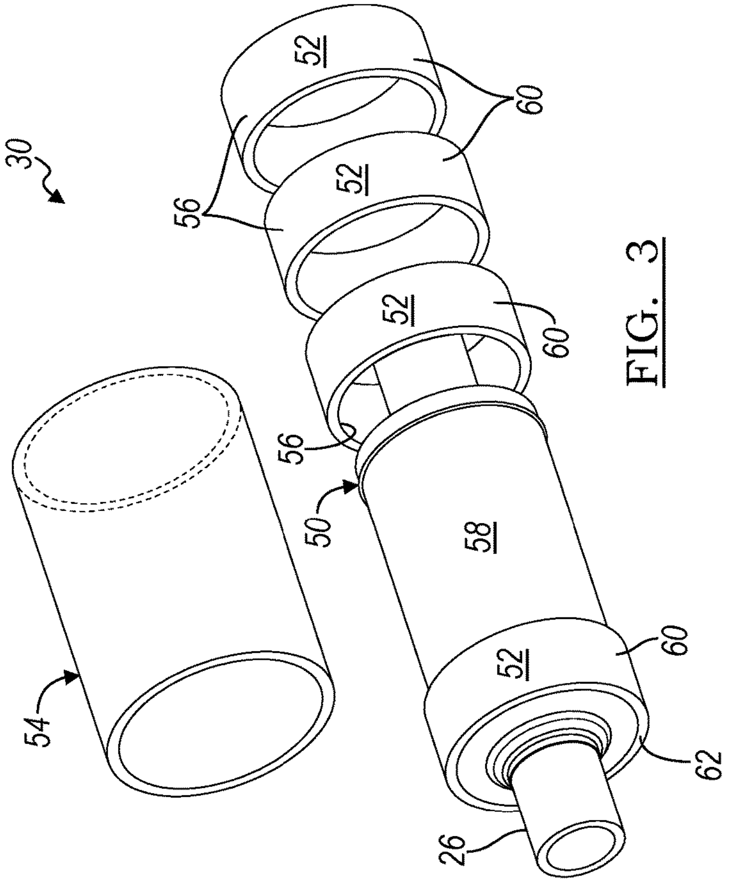
FIG. 3 is an exploded view depicting an implementation of a rotor assembly.

Turning to FIGS. 3-4, an implementation of a rotor assembly 30 used with the electric motor 18 is shown in more detail. An exploded view of the rotor assembly 30 is shown in FIG. 3 while a rotor assembly 30 including the permanent magnet assembly 50 combined with the composite sleeves 52 and barrier coating 54 is shown in FIG. 4. The permanent magnet assembly 50 is coupled with an output shaft of the electric motor 18 in the form of the turbine shaft 26. The permanent magnet assembly 50 is attached to the turbine shaft 26 in a way that prevents the angular displacement of the assembly 50 relative to the shaft 26 and communicates angular motion from the electric motor 18 from the induced movement of the permanent magnet assembly 50 in response to electrical current flow through windings of the stator 32. A plurality of composite sleeves 52 can be placed concentrically relative to the permanent magnet assembly 50 such that the sleeves provide a compressive, radially-inward force on the assembly 50. The composite sleeves 52 can include a radial inner surface 56 that engages a radial outer surface 58 of the permanent magnet assembly 50 and provides force radially-inwardly toward the turbine shaft 26. The composite sleeves 52 can be formed from a composite fiber reinforced polymer (CFRP). In one implementation, the composite sleeves 52 can be formed from carbon fiber bound together with epoxy resin that hardens the fiber into a desired shape. The rotor assembly 30 having composite sleeves 52 can rotate relative to the stator 32 at elevated speeds that are equal to or greater than 150 meters per second (m/s).

The barrier coating 54 can be applied to the composite sleeves 52 in a variety of ways and can seal the composite sleeves 52 such that the surrounding atmosphere or environment cannot contact the sleeves 52. The rotor assembly 30 can be immersed in a fluid during operation, such as engine oil, and the barrier coating 54 can isolate the composite sleeves 52 from the fluid preventing the fluid from contacting the sleeves 52. In one implementation, the rotor assembly 30 can include composite sleeves 52 that have been slid over and concentrically positioned with respect to a radial outer surface 58 of the permanent magnet assembly 50 so that the radial inner surface 56 of the sleeves 52 engage the surface 58 and provide force radially inwardly. To create the barrier coating 54, the rotor assembly 30 can be immersed in a bath of material existing in liquid form that can later harden and form the barrier coating 54 over a radial outer surface 60 of the composite sleeves 52 as well as an axial outer surface 62 of the sleeves 52. This can be described as a conformal coating with the material comprising silicone, epoxy, or polyurethane, for example.

Other implementations of the rotor assembly are possible such that the barrier coating can be formed differently or that the barrier coating covers different portions of the composite sleeves. For example, the composite sleeves can be immersed in a bath of material existing in liquid form that will harden to form the barrier coating prior to combination with the rotor assembly. The barrier coating can be applied to the outer radial surface of the composite sleeves, inner radial surface of the composite sleeves, and radial surfaces of the composite sleeves. After the barrier coating has been applied to the composite sleeves, the sleeves can be attached to the rotor assembly in which a portion of the barrier coating applied to the composite sleeves engages an outer radial surface of the permanent magnet assembly.

It is possible to apply the barrier coating to the composite sleeves in other ways. For example, the material used to form the barrier coating can be atomized such that the material is sprayed onto the composite sleeves and left to harden or dry thereby forming a barrier coating over the sleeves. The sprayed barrier coat can be a two-part polyurethane, an enamel paint, or a ceramic-based paint (e.g., Cerakote™). In another implementation of the barrier coating, the composite sleeves could be powder coated and then assembled with the permanent magnet assembly. The powder coating can be a thermoset powder coating, such as polyester-TGIC, acrylic urethane, polyester urethane, or a silicone-based coating. The barrier coating could also be a thermoplastic powder coating, such as polyimides (nylon-based coatings), polyethylene, or polypropylene. The barrier coating could be electrosprayed onto the composite sleeves by atmospheric plasma spraying or chemical vapor deposition. It is also possible to create the barrier coating by overmolding the coating onto the sleeves using polyphenylene sulfide (PPS), Ultem (polyetherimide), PEEK (polyetherketone), or FEP (fluorinated ethylene propylene).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A rotor assembly configured to be used by an electric motor, comprising:
- an output shaft;
- a permanent magnet assembly that includes one or more permanent magnets coupled with the output shaft to prevent angular displacement of the permanent magnet(s) relative to the output shaft;
- one or more composite sleeves positioned concentrically and radially outwardly relative to the permanent magnet assembly and at least one end ring; and
- a barrier coating, applied to an axial surface axially spaced from the permanent magnet assembly to create a gap between the barrier coating and the permanent magnet assembly, axial outer surfaces of the composite sleeve(s), and radial outer surfaces of the composite sleeve(s) forming a conformal coating that seals the permanent magnet assembly and the composite sleeve, providing a fluid-tight seal that prevents contact between the permanent magnet assembly, axial outer surfaces of the composite sleeve(s), and radial outer surfaces of the composite sleeve(s) with an ambient environment.

2. The rotor assembly of claim 1, wherein the barrier coating extends from the radial outer surface of the composite sleeve(s) to the output shaft.

3. The rotor assembly of claim 2, wherein the barrier coating comprises a powder coating.

4. The rotor assembly of claim 3, wherein the output shaft is turbine shaft for an electrically-assisted turbocharger.

5. The rotor assembly of claim 1, wherein the rotor assembly is included in an electric motor combined with an electrically-assisted turbocharger.

6. The rotor assembly of claim 1, further comprising a stator including a plurality of windings.

7. The rotor assembly of claim 1, wherein the axial surface axially spaced from the permanent magnet assembly is a surface of the at least one end ring.

8. A method of manufacturing a rotor assembly, configured to be used by an electric motor, comprising the steps of:

(a) coupling a permanent magnet assembly that includes one or more permanent magnets to an output shaft;

(b) assembling one or more composite sleeves positioned concentrically and radially outwardly relative to the permanent magnet assembly and at least one end ring; and (c) applying a barrier coating to an axial surface axially spaced from the permanent magnet assembly to create a gap between the barrier coating and the permanent magnet assembly, axial outer surfaces of the composite sleeve(s), and radial outer surfaces of the composite sleeve(s) forming a conformal coating that seals the permanent magnet assembly and the composite sleeve, providing a fluid-tight seal that prevents contact between the permanent magnet assembly, axial outer surfaces of the composite sleeve(s), and radial outer surfaces of the composite sleeve(s) with an ambient environment.

9. The method of claim 8, wherein the barrier coating extends from the radial outer surface of the composite sleeve(s) to the output shaft.

10. The method of claim 9, wherein the barrier coating comprises a powder coating.

11. The method of claim 10, wherein the output shaft is turbine shaft for an electrically-assisted turbocharger.

12. The method of claim 8, wherein the barrier coating is applied by immersing the rotor assembly in a bath of material.

13. The method of claim 8, wherein the axial surface axially spaced from the permanent magnet assembly is a surface of the at least one end ring.

* * * * *